United States Patent [19]
Au

[11] Patent Number: 5,729,718
[45] Date of Patent: Mar. 17, 1998

[54] SYSTEM FOR DETERMINING LEAD TIME LATENCY AS FUNCTION OF HEAD SWITCH, SEEK, AND ROTATIONAL LATENCIES AND UTILIZING EMBEDDED DISK DRIVE CONTROLLER FOR COMMAND QUEUE REORDERING

[75] Inventor: Wing Yee Au, Sunnyvale, Calif.

[73] Assignee: Quantum Corporation, Milpitas, Calif.

[21] Appl. No.: 641,662

[22] Filed: May 1, 1996

Related U.S. Application Data

[63] Continuation of Ser. No. 149,982, Nov. 10, 1993, abandoned.

[51] Int. Cl.[6] .......................... G06F 13/28; G11B 5/012
[52] U.S. Cl. .......................... 395/494; 395/438; 395/825; 395/859; 360/98; 360/48; 369/47; 369/178
[58] Field of Search .......................... 395/602, 438, 395/440, 494, 825, 844, 859; 360/98, 48; 369/47, 178

[56] References Cited

U.S. PATENT DOCUMENTS

| | | | |
|---|---|---|---|
| 4,232,365 | 11/1980 | Englund | 364/200 |
| 4,270,154 | 5/1981 | Crawford | 360/98 |
| 4,583,166 | 4/1986 | Hartung et al. | 364/200 |
| 5,140,683 | 8/1992 | Gallo et al. | 395/425 |
| 5,241,546 | 8/1993 | Peterson et al. | 371/37.1 |
| 5,255,136 | 10/1993 | Machado et al. | 360/77.02 |
| 5,422,762 | 6/1995 | Jerbic | 395/600 |
| 5,432,922 | 7/1995 | Polyzois et al. | 395/452 |
| 5,581,784 | 12/1996 | Tobagi et al. | 395/826 |

FOREIGN PATENT DOCUMENTS

WO 8903089  4/1989  WIPO .

OTHER PUBLICATIONS

Abbot et al, "Scheduling I/O Requests with Deadlines: A Performance Evalua", Dec. 5–7, 1990 pp. 116–117, IEEE: Real-Time Systems, 1990 Symposium.

Ng, "Improving Disk Performance via Latency Reduction", Jan. 1991, pp. 22–24, IEEE Transactions on Computers.

(List continued on next page.)

*Primary Examiner*—Christopher B. Shin
*Assistant Examiner*—Rehana Perveen
*Attorney, Agent, or Firm*—David B. Harrison

[57] ABSTRACT

A method for reordering a queue of disk storage input/output (I/O) transfer commands for a hard disk drive. "Lead time" latencies are calculated for the commands in the queue with respect to the active command. The command with the least lead time latency is selected and promoted to first in the queue. Lead time is seek time plus rotational latency. Lead time may be calculated as the time required for n revolutions of the disk, where the seek time is greater than that time, but less than that required for n+1 revolutions of the disk, plus the rotational time that is required to move from the ending angular position of the active command to the beginning angular position of the subsequent command. In a preferred embodiment, the calculations of lead time are performed in two stages. The first stage determines the beginning and ending physical locations of the I/O transfers for the commands in the queue. These locations do not change for a command and thus these calculations need be performed only once per command. The second stage determines the lead time for each command in the queue with respect to the active command. These values change for each active command and thus must be determined for each command in the queue every time a new command becomes active.

9 Claims, 6 Drawing Sheets

OTHER PUBLICATIONS

Salem, "Performance Evaluation of Movable Head Disk Schedules", Sep. 16–18, 1991 pp. 250–253 Software Engineering for Real Time Systems (IEE Conf. Pub. 344).

IBM Technical Disclosure Bulletin, "Enhanced Disk Task Sequencing", Oct. 1986, pp. 1946–1948, vol. 29, No. 5.

McGraw et al (IBM TDB), "Priority Circuit Servicing Requests Queued by Sector", Nov. 1969, pp. 815–819, vol. 12, No. 6.

Seltzer et al, "Disk Scheduling Revisited", Jan. 1990, pp. 313–323, USENIX Winter 1990 Washington, DC.

Gibson, *Redundant Disk Arrays—Reliable, Parallel Secondary Storage*, MIT Press, Cambridge MA, ©1992, pp. 17–20: "Lowering I/O Response Time".

Geist & Daniel, "A Continuum of Disk Scheduling Algorithms", *ACM Trans. Computer Systems*, vol. 5, No. 1, Feb. 1987, pp. 77–92.

Teory & Pinkerton, "A Comparative Analysis of Disk Scheduling Policies", *Comm. of the ACM*, vol. 15, No. 3, Mar. 1972, pp. 177–184.

Denning, "Effects of Scheduling on File Memory", *AFIPS Joint Computer Conference Proc.* vol. 30, 1967, pp. 9–21.

1

SYSTEM FOR DETERMINING LEAD TIME LATENCY AS FUNCTION OF HEAD SWITCH, SEEK, AND ROTATIONAL LATENCIES AND UTILIZING EMBEDDED DISK DRIVE CONTROLLER FOR COMMAND QUEUE REORDERING

REFERENCE TO RELATED APPLICATION

This is a continuation of application Ser. No. 08/149,982 filed on Nov. 10, 1993, now abandoned.

FIELD OF THE INVENTION

The present invention relates to the queuing of commands received by a disk drive. More specifically, the present invention relates to the reordering of commands in the queue to minimize latency in processing the commands.

BACKGROUND OF THE INVENTION

A disk drive can receive commands to execute multiple, random I/O transfers. These commands may require data to be written or read at various locations on the disks. When the commands arrive faster than they can be executed, they are accumulated in a queue.

By recognizing that the commands need not be executed in the order they are received, I/O throughput may be increased by minimizing latency between transfers. The executing of commands in an order different from that in which they are received is called command queue reordering.

Various methods have been used before in reordering a disk drive I/O command queue. One method termed "Shortest Seek Time First," or SSTF, reorders the commands in the queue so that the command which has the shortest seek time with respect to the command being executed is executed next. However, as the queue fills, the commands which require I/O transfers near the inner and outer edges of the disk tend to not get processed. Another method called the SCAN method reorders the commands in the queue such that they are processed in cylinder number order, ensuring that I/O transfers near the edges of the disk are processed. These and other queuing methods based on the cylinder number of the I/O transfers are described and analyzed in Teorey and Pinkerton, "A comparative Analysis of Disk Scheduling Policies," *Comm. ACM*, Vol. 15, No. 3, March 1972, pp. 177–184, in Geist and Daniel, "A continuum of Disk Scheduling Algorithms," *ACM Trans. on Computer Systems*, Vol. 5, No. 1, February 1987, pp. 77–92, and in Denning, "Effects of Scheduling on File Memory Operations," *American Federation of Information Processing Societies (AFIPS) Joint Computer Conference Proceedings*, Vol. 30, 1967, pp. 9–21.

Hartung, U.S. Pat. No. 4,583,166, Gallo et al., U.S. Pat. No. 5,140,683, and Englund, U.S. Pat. No. 4,232,365 also describe various queue reordering techniques.

The above-mentioned references do not recognize the coequal importance of seek time and rotational latency in determining the time delay between executing commands. When average head actuator access times are near the disk rotational time, what is needed is a manner of reordering a command queue which accurately accounts for the latencies encountered between typical I/O transfers.

SUMMARY OF THE INVENTION

A general object of the present invention is to improve data throughput of a mass storage device by reordering a queue of data transfer commands to minimize actual latency, including both seeking time and rotational latency.

The present invention reorders a command queue by minimizing the actual latency of subsequent commands. The actual latency includes the seek time latency and rotational latency.

According to one aspect of the present invention, a queue is reordered with respect to an active command. As a first step, lead time latencies are determined for the commands in the queue with respect to the active command. The command having the least lead time latency is selected and promoted to the front of the queue, where it will be executed after the active command.

As a feature of the present invention, the calculations of lead time are performed in two stages. The first stage determines the beginning and ending physical locations of the I/O transfers for the commands in the queue. These locations do not change for a command and thus these calculations need be performed only once per command. The second stage determines the lead time for each command in the queue with respect to the command being executed, or "active command." The lead time latency changes with respect to each active command and thus must be determined for each command in the queue every time a new command becomes the active command.

The foregoing and additional objects, features and advantages of the present invention will be more readily apparent from the following detailed description of preferred embodiments thereof which proceed with reference to the accompanying drawings.

DETAILED DESCRIPTION OF THE PREFERRED EMBODIMENT

Figure 1:
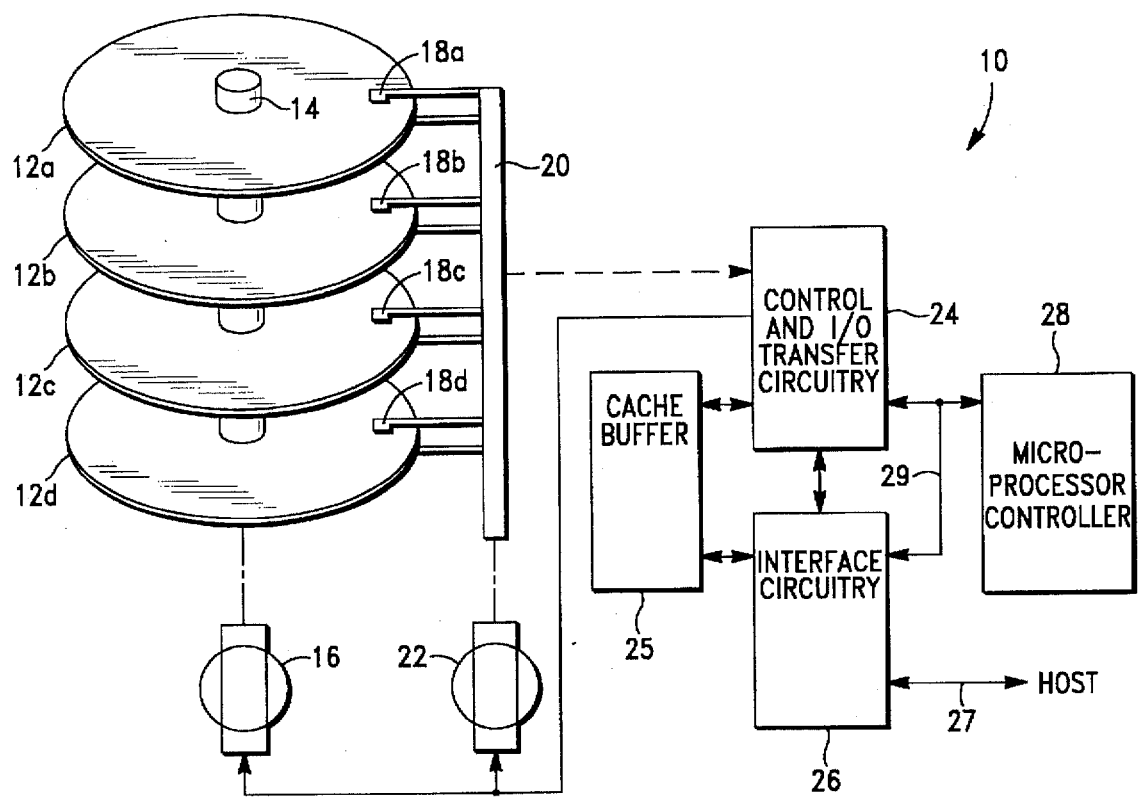
FIG. 1 is a simplified diagram of a disk drive which is capable of performing the present invention.

Referring now to FIG. 1, a disk drive 10 includes a plurality of disks 12a–12d rigidly attached to a spindle 14. A motor 16 rotates the spindle, thereby rotating the disks 12 at a predetermined rotational speed during data reading and data writing operations.

A plurality of data transducer heads 18a–18d, one for each surface of the disks 12a–12d (heads for the lower surfaces are hidden in the drawing by the disks), are connected in a head stack assembly 20. An actuator 22 can move the head stack assembly 20 as a unit within a range of positions between a position with the heads 12a–12d near the spindle 14 and a position with the heads near the edges of the disks. In this manner, any location on the surfaces of the disks can be made to pass by a head.

A control circuit 24 controls the rotational speed of the disks 12a–12d and the position of the head stack assembly 20. This circuit 24 may include its own embedded digital signal processor for performing servo calculations and controls needed for precisely positioning the head stack during track seeking and track following operations. Other portions of the circuit 24 receive and interpret signals from the head stack assembly 20. Typically, although not necessarily, the user data record positions are formed as data sectors or blocks within a multiplicity of concentric data tracks defined on each storage surface. In optical recording, a single spiral data track may be employed.

An interface circuit 26 communicates with a host computing system (not shown) via a host bus 27, thereby receiving commands and storing or providing data and status values in response to the commands.

A cache buffer memory array 25 is provided between the circuits 24 and 26 and provides temporary storage of user data blocks in transit between the host and storage locations of the disks 12. A microprocessor-based drive controller 28 exercises supervisory control over the control and I/O transfer circuit 24 and the interface circuit 26, and the controller keeps track of locations of data blocks in temporary storage in the cache buffer 25.

A more detailed preferred embodiment of a disk drive is disclosed in commonly assigned U.S. Pat. No. 5,255,131 to Machado et al., entitled: "High Capacity Submicro-Winchester Fixed Disk Drive", the disclosure thereof being incorporated herein by reference.

Figure 2:
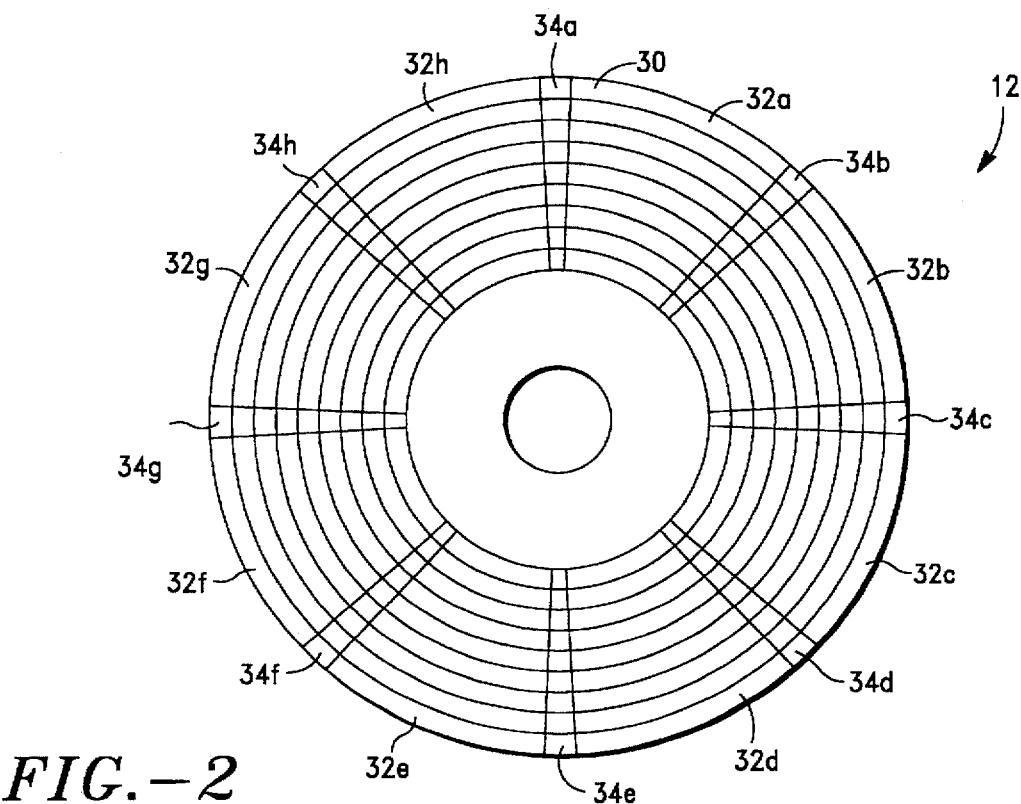
FIG. 2 is a simplified recording plan diagram of a data storage disk included within the disk drive of FIG. 1.

Referring now to FIG. 2, a simplified arrangement of data storage on a disk 12 is divided into concentric circular "tracks" (on each surface) or "cylinders" (i.e., when vertically aligned track locations of the disk storage surfaces are considered together), the outer cylinder being shown by reference number 30. Each cylinder is further divided into user data sectors 32a–32h by prerecorded servo sectors 34a–34h. A "logical block address" or "LBA" is used to address various locations on the disks 12a–12d. Each LBA maps into a cylinder, head, and sector within the disk drive 10.

Figure 3:
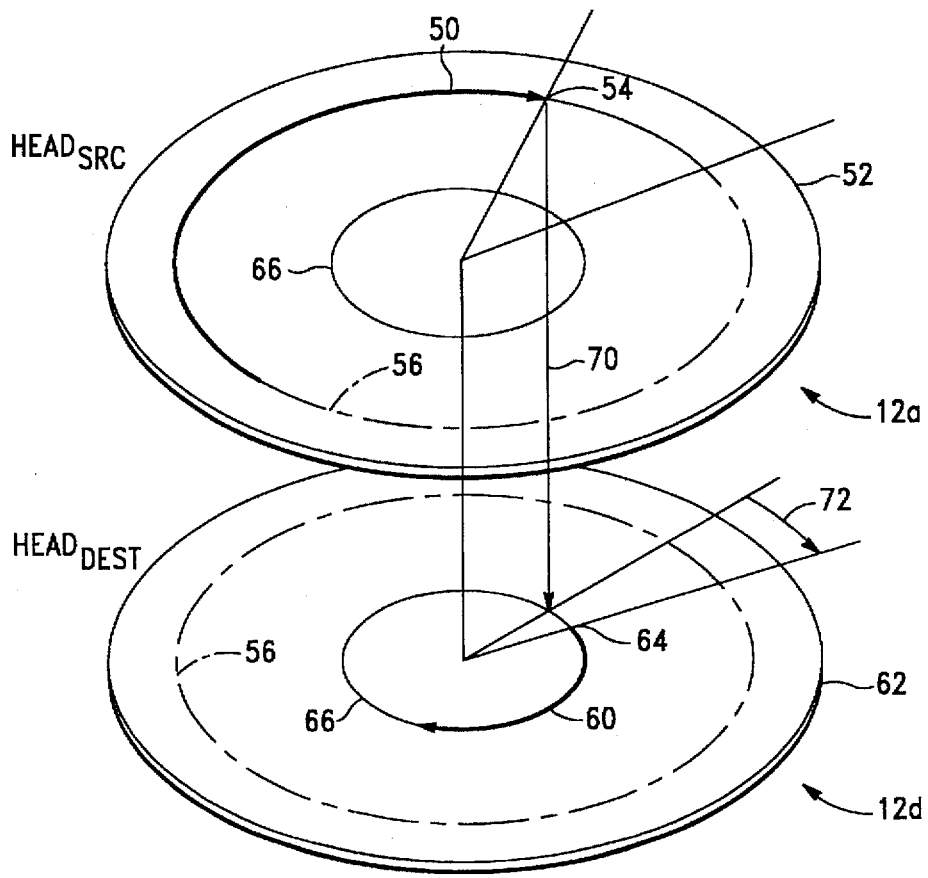
FIG. 3 is a simplified diagram of a pair of I/O transfers on two disks.

Refer now to FIG. 3 which shows two I/O transfers. The first transfer 50 occurs on a first cylinder "cylinder$_{src}$" 56 by a first head "head$_{src}$" (e.g. head 18a) on disk storage surface 52 (e.g. of disk 12a) and ends at sector location "sector$_{src}$" 54. The second transfer 60 occurs on a second cylinder "cylinder$_{dest}$" 66 by a second head "head$_{dest}$" (e.g. head 18d) on disk storage surface 62 (e.g. of disk 12d) and starts at sector location "sector$_{dest}$" 64.

After the first transfer 50 is completed, the actuator 22 (FIG. 1) moves the head stack assembly 20 from the first cylinder 56 to the second cylinder 66. The time required for this movement is termed "seek time." Also, the control circuitry 24 switches from using the head associated with the first disk surface 52 to using the head associated with the second disk surface 62, requiring a "head switch time." The seek time and head switch time overlap each other and are shown in the FIG. 3 by the line 70. Finally, the disk storage surfaces 52, 62 must rotate sector location 64 to the second head. The time required for this rotation is termed "rotation latency" and is graphed as an angular arc 72 in FIG. 3.

In the example of FIG. 3, lead time is the minimum time which elapses between the end of the first I/O transfer 50 and the beginning the second I/O transfer 60. Queue reordering is used to increase the I/O throughput by minimizing latency between transfers. According to the present invention, "lead time" is the latency which should be minimized. Lead time can be defined according to the following equation:

$$\text{Lead time} = \text{rotational latency} + \text{MAX}(\text{seek time}, \text{head switch time}) \quad (1)$$

Henceforth in this discussion, "seek time" is generalized to mean the greater of the time required to switch heads and the time required to move the head from the source track to the destination track, and is shown as the second term on the right side of Equation (1).

Seek time is dependent on the drive hardware and varies non-linearly according to the number of cylinders traversed and whether a head switch is involved. Seek time must be measured and a "seek_profile" of the measured seek times is then compiled as a function as shown in Equation (2).

$$S = \text{seek\_profile}(\Delta\text{cylinder}, \Delta\text{head}) \quad (2)$$

In Equation (2), Δcylinder is the absolute value of the difference between the destination cylinder "cylinder$_{dest}$" 66 and the source cylinder "cylinder$_{src}$" 56, as shown in Equation (3).

$$\Delta\text{cylinder} = \text{ABS}(\text{cylinder}_{dest} - \text{cylinder}_{src}) \quad (3)$$

Similarly, Δhead is the absolute value of the difference between the destination head "head$_{dest}$" and the source head "head$_{src}$," as shown in Equation 4.

$$\Delta\text{head} = \text{ABS}(\text{head}_{dest} - \text{head}_{src}) \quad (4)$$

If a subsequent I/O transfer is on the same disk surface and cylinder as the preceding I/O transfer, then the required seek time is zero; lead time will be the time required for the disk to rotate from the angular position of sector$_{src}$ to the angular position of sector$_{dest}$. This time is called "rotational time" or "R" and is calculated by multiplying the number of sectors between the two positions Δsector by the sector time. The sector time is the time T required for one revolution of the disk divided by the number of sectors per track, as shown in Equation (5).

$$R = \Delta\text{sector} * (T/\text{sectors\_per\_track}) \quad (5)$$

In Equation (5), Δsector is the number of sectors between the source and destination sectors 54, 64, as shown in Equation (6).

$$\Delta\text{sector} = (\text{sector}_{dest} - \text{sector}_{src}) \text{ MOD sectors\_per\_track.} \quad (6)$$

The rotational time R is dependent solely on the relative positions of the source sector 54 and the destination sector 64, given that the rotational speed of the storage disks 12 is constant.

Figure 4:
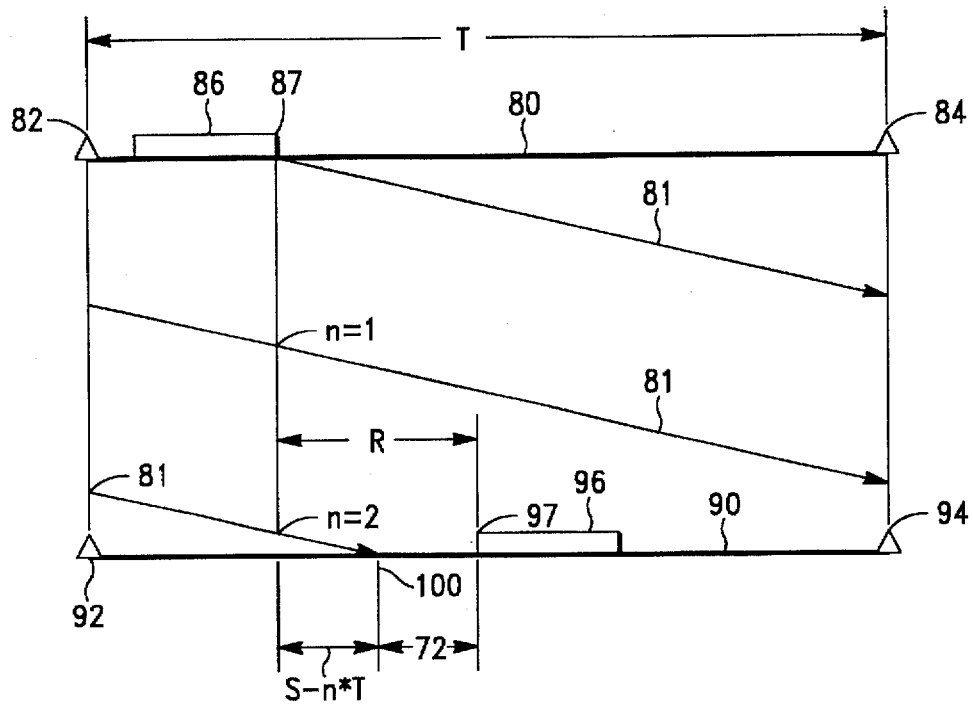
FIGS. 4 and 5 are time diagrams for two separate examples showing the relationship between lead time, seek time, and rotation time.

Referring now to FIGS. 3 and 4, the relation between lead time L, seek time S, and rotational time R can be graphically illustrated. Assume that the seek time S takes more than n revolutions of the disks 12, but less than n+1 revolutions, where n is an integer. In FIG. 4, line 80 represents the time T required for the head 18a to travel the full circumference of the source cylinder 56. Since the disk 12a is rotating, the head 18a traverses the source cylinder 56 in a cyclical manner. Thus the triangles 82, 84 represent the time at which the head 18a passes the same arbitrary marker location on the source cylinder. Block 86 represents the time during the source I/O transfer with 87 being the time the head 18a passes the source sector 54.

Similarly, line 90 represents the time required for the read-write head 18a to travel the full circumference of the destination cylinder 66. Likewise, the triangles 92, 94 represent the same time at which the head 18d passes the same arbitrary location on the destination cylinder. Block 96 represents the time during the destination I/O transfer with 97 being the time the head 18d passes the destination sector 64.

FIG. 4 has been drawn so that times which line up vertically in the drawing represent a radial spatial relationship on the disk. Thus, triangles 82, 84, 92, and 94 represent the time the heads 18a and 18d pass an arbitrary radial lines on the disks 12a and 12d. Note that the same amount of time is required to traverse a shorter, inner track as for a longer, outer track because the disk rotation speed is constant regardless of which cylinder the head is positioned at.

Immediately after passing the source sector 54, the head stack 20 begins seeking to the destination cylinder 66, as shown by the diagonal lines 81. Shortly after n=2 revolutions, the head 18d settles on the destination cylinder 66 at a location marked by reference number 100. After waiting the rotational latency time 72, the head 18d reaches time block 96 representing passage over the destination sector 64 on the disk 12d.

As shown by Equation (1), the lead time L in this example is the sum of the seek time S and the rotational latency 72 (where the head switch time from head 18a to head 18d has been absorbed into the seek time). However, rather than calculating lead time using Equation (1), one will recognize that the lead time is also the amount of time required for the n revolutions of the disk plus the rotational time R, where R is defined in Equation (5). This relationship is shown in Equation (7).

$$L = R + n*T \qquad (7)$$

The original discussion of rotational time R involved a situation where no seeking was required. The example given in FIG. 4 shows a situation where the destination sector 64 passes under the head 18d before n+1 revolutions.

Figure 5:
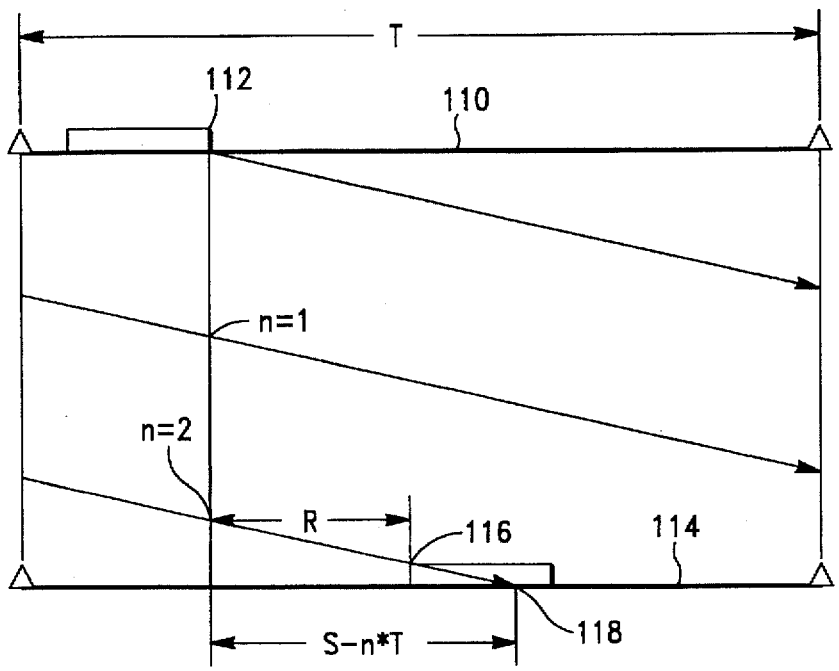

Referring now to FIGS. 3 and 5, another illustration is shown where the head stack 20 begins seeking from a source cylinder 56 to a destination cylinder 66 immediately after passing a source sector 54 at time 112. As in FIG. 4, the head 18d settles on the destination cylinder 66 at a location marked by a reference numeral 118 shortly after n=2 revolutions of the disk 12. However, the beginning of the destination sector 116 has already passed the head, thereby requiring an additional revolution of the disk before the destination sector can be read from or written to. Thus, the lead time is the rotational time R plus the time require for n+1 revolutions of the disk. This relationship is shown in Equation (8).

$$L = R + (n+1)*T \qquad (8)$$

The choice between using Equation (7) or Equation (8) in determining lead time L can be made by comparing the rotational time R with the amount of seek time S remaining after n revolutions are completed, or S−n*T. When the rotational time R is greater, Equation (7) must be used, otherwise, Equation (8) must be used. Equations (7) and (8) are generalized as Equation (9).

$$L = \begin{matrix} R+(n+1)*T \text{ if } S-n*T > R \\ R+N*T \text{ if } S-n*T \leq R \end{matrix} \qquad (9)$$

where $$n*T \leq S < (n+1)*T$$

By way of example, lead time L may be calculated using the following C language code segment:

| | |
|---|---|
| seek_left = S; | /* seek time left */ |
| accum = R; | /* accumulated delay */ |
| While (seek_left > 0 && | /* loop for each */ |
| | /* revolution */ |
| seek_left > R) { | /* until we reach */ |
| | /* target sector */ |
| seek_left = seek_left − T; | /* take a revolution */ |
| | /* off seek time left */ |
| accum = accum + T; | /* and add one to */ |
| | /* accumulated delay */ |
| } | |
| L = accum; | /* lead time is */ |
| | /* accumulated delay */ |

Under the SCSI protocol, a host sends only the Logical Block Address (LBA) and the transfer length in an I/O command. However, to determine lead time latency, the exact cylinder, head, and angular position of both the first and last sector of the transfer for every command in the queue must be determined.

Although the discussion above uses an I/O transfer's sector number as a measure of its angular position on the disk, performance features of the drive may make the sector number only indirectly related to its angular position. For example, track skewing may be used to improve sequential I/O transfer. As a result, even for adjacent tracks, the same logical sector number does not correspond to the same physical sector number on the track. Thus, the sector determining steps 220 and 224 must de-skew the logical sectors to the same reference, which is sector 0 of cylinder 0, head 0.

Furthermore, with zone recording, every zone typically has a different number of data sectors per cylinder (although the number of servo sectors may remain constant across the disk surface). For example, sector 50 in zone 0 may not be at the same angular position on the cylinder as sector 50 in zone 15. Because every track has the same number of servo wedges, a servo wedge number may be used to accurately describe an angular position on a disk.

The equation for rotational time R discussed above was for the case of standard, non-skewed sectors on a disk as shown in FIG. 2. A "wedge" corresponds to a servo sector location. A generalized equation for rotational time R to be in terms of wedge numbers is given in equation (10).

$$R = \Delta wedge * (T/wedges\_per\_track) \qquad (10)$$

In Equation (10), $wedge_{src}$ is the wedge number corresponding to the final sector 54 (FIG. 3) of the reference command 130a (FIG. 6) and $wedge_{dest}$ is the wedge number corresponding to the first sector 64 of the command for which lead time is to be calculated and where Δwedge is the count of wedge numbers between the source and destination wedge numbers, as shown in Equation (11).

$$\Delta wedge = (wedge_{dest} - wedge_{src}) \text{ MOD } wedges\_per\_track. \qquad (11)$$

Figure 6:
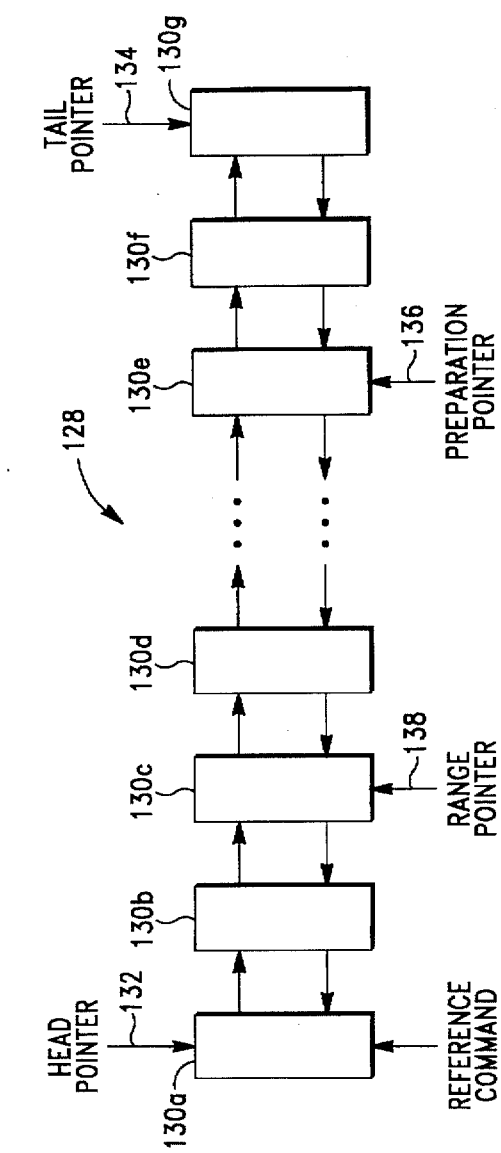
FIG. 6 is a block diagram of a preferred queue structure for holding command records.

The present invention reorders commands contained within a queue. Preferably, the queue is a double-linked list of queued I/O command records. Referring now to FIG. 6, the queue contains a plurality of records 130a–130g. At the beginning of the queue is the active record 130a, which is the record being executed. It is pointed to by the head pointer 132. The first, active record points to a second record 130b, which, absent queue reordering, contains the next command to be executed. As is the nature of double-linked lists, the second record 130b points back to the first record 130a and to a third record 130c. The last record 130g in the queue is pointed to by a tail pointer 134.

For a detailed description of a double-linked queue structure used to store commands in a disk drive, refer to copending, commonly-assigned U.S. patent application Ser. No. 07/953,970 filed on Sep. 30, 1992, now abandoned, for "SCSI II Command Queuing, Processing and Execution in Disk Drive", the disclosure thereof being incorporated herein by reference.

Each queue record 130a–130g contains fields which store intermediate and final results used in the lead time calculations. Each queue record also contains flags which indicate the progress of calculations for that record. Finally, each queue record contains a field which holds the latency with respect to the current "reference command," that is the command currently being executed and pointed to by the head pointer 132. The following table lists the fields in a queue record.

TABLE 1

| QUEUE RECORD |
| --- |
| Command Data Block (CDB) |
| Initial Logical Block Address (LBA) |
| Transfer Length |
| Final Logical Block Address (LBA) |
| Initial cylinder, head, sector number |
| Final cylinder, head, sector number |
| Initial servo wedge number |
| Final servo wedge number |
| Status Flags |
| Lead Time Latency L |

Four processes act on the queue 128. The first is the Insert Queue process which takes incoming commands from the host and appends them to the queue. As is standard in the handling of double-linked data structures, the Insert Queue process sets the previously last record and the new last record to point to each other and resets the tail pointer 134 to point to the new last record.

A second process is the Delete Queue process which removes commands from the queue 128 after they have been executed. This process acts as is standard for the handling of double-linked lists, removing the record pointed to by the head pointer 132 and resetting the head pointer to point to the next record, which then becomes the first record in the queue.

A third process is the Command Preparation process which prepares the records in the queue 128 for lead time calculation. This process uses the preparation pointer 136 and is discussed in more detail below.

A fourth process in the Queue Reorder process which performs the lead time calculations for the records in the queue 128 and reorders the commands using the range pointer 138. This process is also discussed in more detail below.

The Insert Queue process and the Delete Queue process represent the behavior of the drive as seen by its host and bus. They are time critical and must be performed in real time. The Command Preparation process and the Queue Reorder process are internal to the disk drive and are used in reordering the queue 128.

Figure 7:
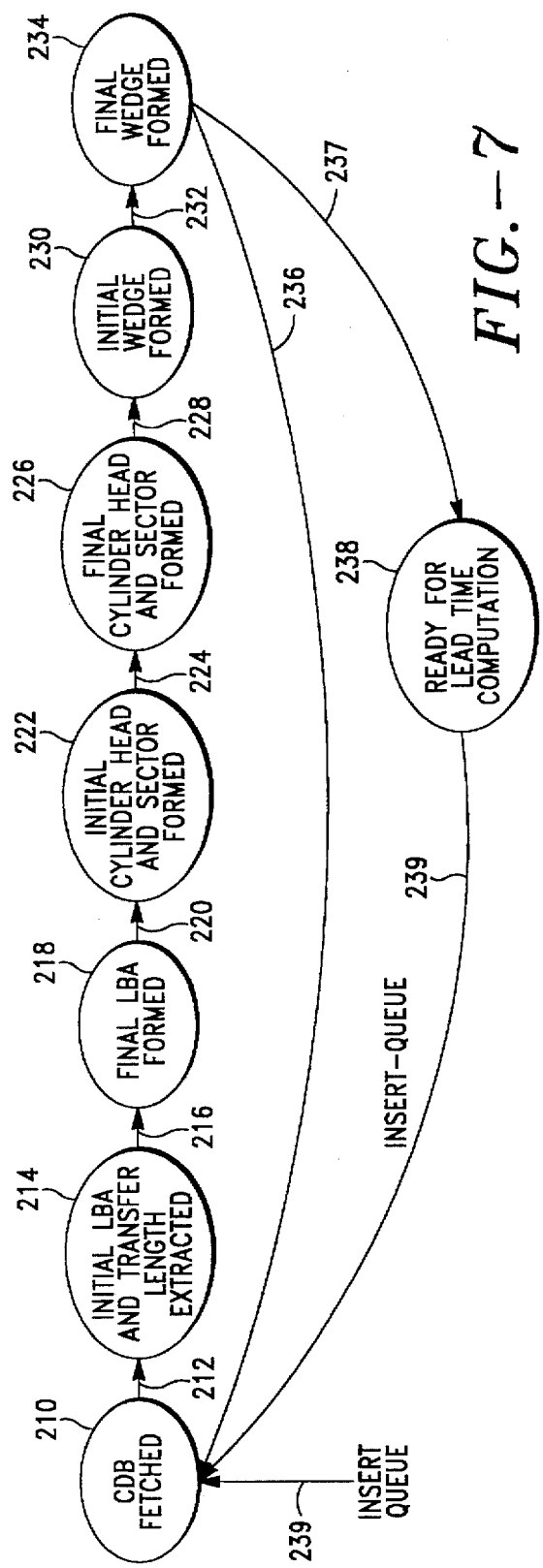
FIG. 7 is a state diagram of an exemplary process of preparing commands in a queue for a command queue reordering process described in conjunction with FIG. 9.

The Command Preparation process sweeps the preparation pointer 136 down through the queue 128 to incrementally compute the intermediate values that are needed for the lead time calculations. The initial and final cylinder, head, and servo wedge numbers are the intermediate values that must be determined for each command record 130a–130g in the queue 128 before the lead time is calculated between the reference command 130a and any other commands 130b–130g in the queue 128. The Command Preparation process is shown in more detail in the state diagram of FIG. 7.

When a record is added to the queue 128 by the Insert Queue process, the record's Command Data Block is fetched during a transition 239 and the CDB Fetched state 210 is entered. Next, the initial Logical Block Address and Transfer Length are extracted during a transition 212 from the Command Data Block and the next state 214 is entered. From the initial LBA and transfer length, the final LBA is determined during a transition 216 and the next state 218 is entered. From the initial and final LBAs, the initial and final cylinder, head, and sectors are determined respectively during transitions 220, 224, and the next two states 222, 226 are sequentially entered. Next, the initial wedge is determined during a transition 228 and the Initial Wedge Formed state 230 is entered. Similarly, the final wedge is determined during a transition 232, and the Final Wedge Formed state 234 is entered.

Once in the Final Wedge Formed state 234, if the preparation pointer 136 equals the tail pointer 134, then all queue records 130a–130g have had their intermediate values determined. The Command Preparation process thus enters the Ready for Lead Time Computation state 238. This state is exited only when another record is added to the queue 128 by the Insert Queue transition 239.

If the preparation pointer 136 does not equal the tail pointer 134, then there are yet queue records for which the intermediate values need to be calculated. Thus, the preparation pointer is moved to the next record and its command data block is fetched, thereby entering the CDB Fetched state 210.

A large amount of calculations are required to prepare for lead time calculation. While the disk drive is performing the steps of FIG. 7, it is also executing the active command in real time. The Command Reordering process must be dynamic, enabling commands to enter and exit the queue at any time. For every command that enters or exits, new lead times must be calculated, and the commands must be arranged according to the new constituency of the queue. Although all the computation of the intermediate values and the corresponding lead times could be done during the Insert Queue process or Delete Queue process, this would add an unacceptable time delay on command execution.

Furthermore, the microprocessor 28 in the drive may be responsible for handling the motor, sequencer, and data transfer processing on both the host and the disk sides of the interface 26. These processes are even more time critical than command handling, and cannot be delayed when reordering commands.

For these reasons, the processor's computation for rotational latency reordering must be overlapped with the time when the processor is relatively idle, such as during a seek or in the middle of a long, uninterrupted data transfer. When a time critical event is detected, the Command Preparation and the Queue Reorder processes must be suspended until after the event has been handled. Then, the processes may be resumed from where they were interrupted. A resumption without restarting the reordering process at its beginning requires the process to have an internal state. The internal state keeps track of how far the reordering process has progressed.

As discussed above, the preparation pointer 136 keeps track of which queue record is being processed in the Command Preparation process. Additionally, flags in the queue record (as shown in TABLE 1) indicate the progress for intermediate calculations in the Command Preparation process. After each new calculation, the flags are updated to indicate the status of calculations. Thus, if the Command Preparation process is interrupted, it can be resumed where it left off by checking the preparation pointer 136 and the flags.

The updating of the flags after each increment of progress allows the Command Preparation process to be broken into fine granularity. This allows for the handling of time-critical events with minimal delay and with no repeated calculations.

Figure 8:
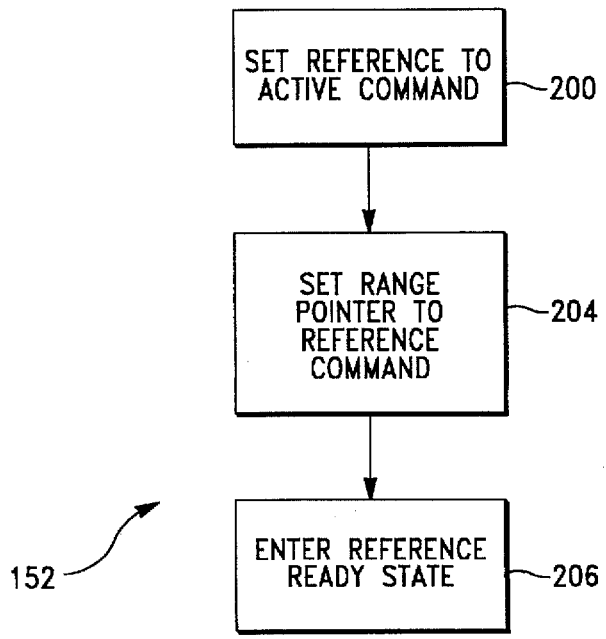
FIG. 8 is a flow diagram of the Make Reference transition of the FIG. 9 reordering process.
Figure 9:
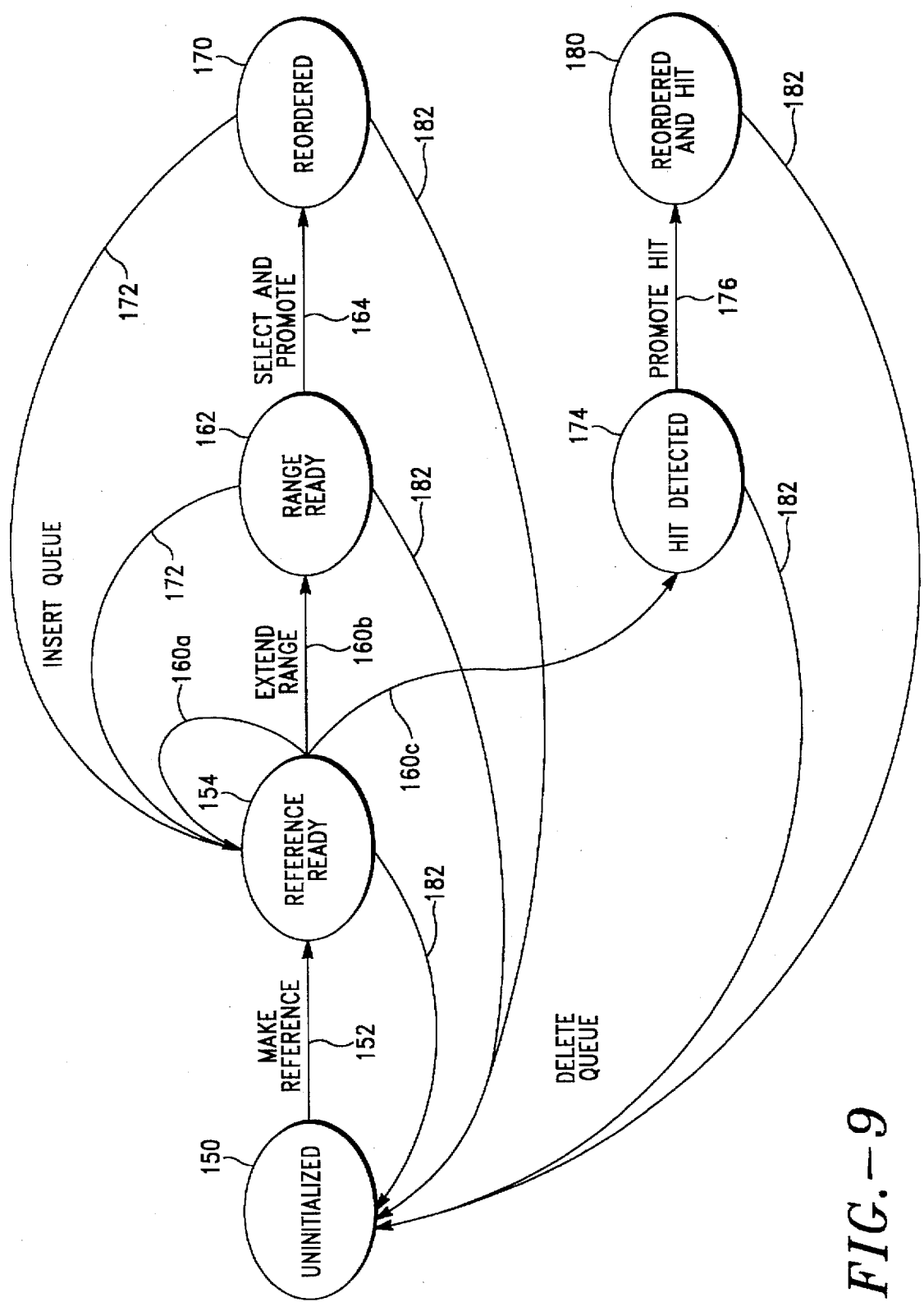
FIG. 9 is a state diagram of an exemplary process of reordering a queue of disk drive I/O commands awaiting execution in order to minimize lead time latency according to the present invention.

The state diagram of FIG. 9 shows the operation of an exemplary Queue Reorder process by minimizing lead time L according to principles of the present invention. The state diagram is entered at the Uninitialized state 150. The Uninitialized state 150 is exited through the Make Reference transition 152 which is shown in more detail in the flow chart of FIG. 8.

Referring now to FIG. 8, as a first step 200, the active command 130a (FIG. 6) is set to be the reference command. As a next step 204, the range pointer 138 is set to point to the reference command 130a. As a final step 206, the Reference Ready state 154 is entered.

Figure 10:
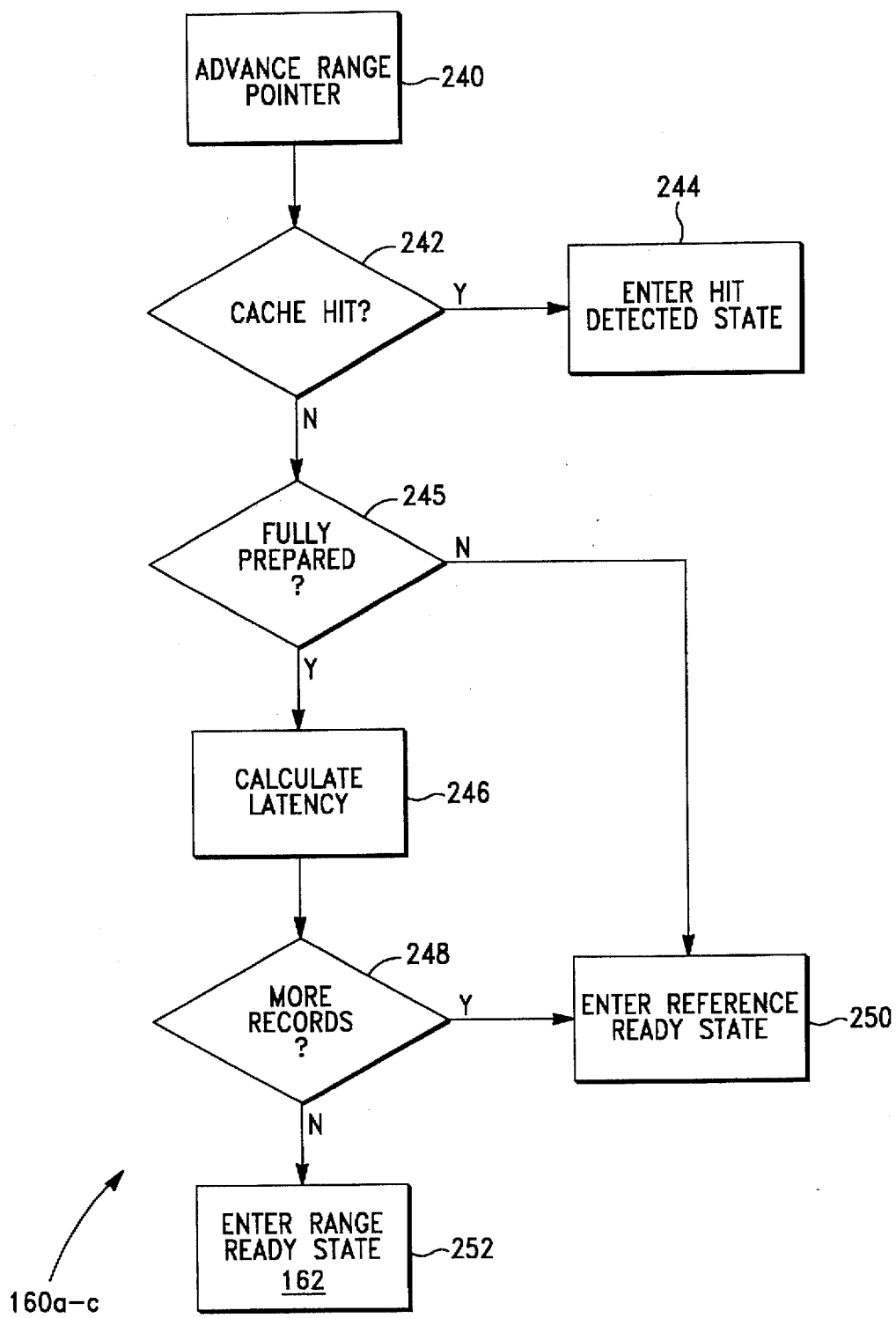
FIG. 10 is a flow diagram of the Extend Range transition of FIG. 9.

Referring again to FIG. 9, the lead time L for each command is calculated in the Extend Range transition 160a–160c, which is shown in more detail in FIG. 10.

Referring now to FIG. 10, as a first step 240 of the Extend Range transition 160a–160c, the range pointer 138 is advanced to the next command record in the queue 128. In the Make Reference transition 152, the range pointer 138 was initialized to the reference command 130a. Thus, the first time through the Extend Range transition, the range pointer is moved to point to the second command 130b in the queue.

If the information requested by the command is contained in the cache buffer 25, as determined by a logical node 242, then the Hit Detected state 174 is entered at a step 244. This is shown by the line 160c in FIG. 9. The consequences of a cache hit will be discussed in more detail below.

If the range pointer catches up with the command preparation pointer, but the status flags indicate that the command is not fully prepared as tested at a logical node 245, the Reference Ready state is reentered at a step 250. This mechanism provides the synchronization between the Reorder Queue and the Command preparation process. If the flags indicate that the command is fully prepared as tested by the node 245, the lead time latency of the command pointed to by the range pointer 138 is calculated with respect to the reference command 130a as a next step 246.

If the range pointer 138 does not equal the tail pointer 134, as determined at a logical node 248, then there are more records to process, and the Reference Ready state 154 is reentered at the step 250. This is shown by the line 160a of FIG. 9. Otherwise, all lead times have been calculated and the Range Ready state 162 is entered at step 252. This is shown by the line 160b of FIG. 9.

Referring again to FIG. 9, the Range Ready state 162 is exited through the Select and Promote transition 164. The reorder range is swept through and the command having the least latency is detected, removed from its present order in the queue, and inserted immediately after the active command 130a. The Reordered state 170 is thus entered.

If the Insert Queue process places another command in the queue 128 while the Queue Reordering process is in either the Range Ready state 162 or the Reordered state 170, then the Reference Ready state 154 is entered through the Insert Queue transition 172. This enables the intermediate values and lead time to be calculated for the newly entered record.

If the Delete Queue process removes the active command 130a from the queue while the Queue Reorder process is in the Reference Ready state 154, the Range Ready state 162, or the Reordered state 170, then the Uninitialized state 150 is entered through the Delete Queue transition 182. This transition from any state other than the Reordered state 170 by Delete Queue means that reordering did not occur in time. Instead, the command next to the active command is executed next regardless of which command has the least lead time latency.

Returning to the Uninitialized state 150 resets the reference command and forces new lead times to be calculated with respect to the new reference command.

As discussed above, the Extend Range transition 160c detects cache hits within cache segments of the buffer memory 25. A cache hit occurs when a data block or sequence being sought by an I/O command has already been prefetched and is located within the cache buffer segments of the buffer 25. Since a cache hit does not require any disk activity, it can be responded to much more quickly than any other type of I/O command. Accordingly, no further search of the queue is done since such a search would be unable to find a command with less lead time. Thus, the Hit Detected state 174 is entered in response to finding a cache hit.

The Promote Hit transition 176 takes the command having the cache hit, removes it from its present order in the queue, and inserts it immediately after the active command 130a. The Reordered and Hit state 180 is thus entered.

The Delete Queue process affects the Hit Detected and Reordered and Hit states 174, 180 in the same manner as the other states discussed above, resulting in a return to the Uninitialized state 150.

The terms and expressions that have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims that follow.

What is claimed is:

1. A method for reordering a queue of disk storage input/output transfer commands with respect to an active command within a disk drive data storage device having an on-board embedded programmed digital controller and an interface for receiving the commands, the method comprising the steps of:

(a) receiving a first plurality of arbitrary length input/output transfer commands into the interface, and decoding and queuing each of the commands within the device by the embedded controller initially in order of receipt from a host computer as a real time process;

(b) determining a lead time latency for the first plurality of the commands in the queue relative to completion of the active command as a non-real time, background process by the embedded controller wherein the lead time latency is determined as a function of head switch, seek, and rotational latencies of the disk drive data storage device;

(c) determining which of the first plurality of the commands has a least lead time latency as a non-real time, background process by the embedded controller;

(d) promoting within the queue as a non-real time, background process by the embedded controller a command determined in step (c) to have the least lead time latency to a position within the queue to be executed immediately following completion of execution of the active command as a real time process by the embedded controller, (e) executing the command promoted in step (d) as a real time process by the embedded controller immmediately following execution of the active command, (f) receiving an additional command from the host at the interface, and decoding and queuing the additional command within the queue to form a second plurality of the commands awaiting execution as a real time process by the embedded controller, (g) redetermining a command within the second plurality having the least lead time latency as a non-real time, background process by the embedded controller, (h) promoting a command determined in step (g) to have the least lead time latency to a position within the queue of the second plurality to be executed immediately following execution the command promoted in step (d) as a non-real time, background process by the embedded controller.

2. The method of claim 1, wherein the step of determining by the embedded controller a lead time latency for each plurality of the commands includes determining a lead time latency for all of the commands in the queue as a non-real time, background process with respect to a presently active command undergoing execution by the embedded controller as a real time process.

3. The method of claim 1, wherein the steps (c) and (g) of determining a lead time latency for each plurality of the commands in the queue with respect to the presently active command are determined by the embedded controller according to the following equation:

$$L = \begin{matrix} R+(n+1)*T \text{ if } S-n*T > R \\ R+N*T \text{ if } S-n*T <= R \end{matrix}$$

where R is disk rotational time, S is cylinder seek time, T is the time required for a single revolution of a disk stack of the device, and n is the integer number of complete revolutions of the disk stack which can occur during the seek time.

4. The method of claim 3, wherein the disk drive device comprises a series of evenly spaced apart embedded servo sectors formed in a multiplicity of concentric data tracks defined on a rotating data storage surface of the disk drive data storage device, and wherein disk rotational time R is determined by steps of solving the following equations:

$$R = \Delta sector * (T/sectors\_per\_track),$$

$$\Delta sector = (sector_{dest} - sector_{src}) \text{MOD} sectors\text{-per-track}.$$

5. The method of claim 4, wherein the disk drive device comprises a plurality of data storage surfaces, wherein servo sectors of all but a reference one of the data storage surfaces have respective circumferential offset skews relative to the reference one, and wherein the step of solving $\Delta sector = (sector_{dest} - sector_{src}) \text{MOD}$ sectors-per-track includes including offset skew in the difference $(sector_{dest} - sector_{src})$.

6. A disk drive connected to a host computer and integrally including at least one data storage disk defining a multiplicity of concentric data track locations and a positionable transducer head for reading data from and for writing data to each selected data track, an interface controller for receiving arbitrary length input/output commands from the host computer, a cache memory buffer for storing the input/output commands within a queue, and an on-board embedded microprocessor controller for reordering the queue of disk storage input/output transfer commands with respect to an active command and for directing the positioning of the positionable transducer head among selected data tracks, the disk drive further comprising:

the interface circuitry for controlling the cache memory buffer by placing the commands from the host computer in the queue initially in order of receipt;

the embedded microprocessor controller including real time processing and control means for beginning execution of a first one of the plurality of commands by starting an on-board input/output data transfer process including a head reposition operation for repositioning the transducer head from a departure track to a destination track;

the embedded microprocessor controller including first processing means for determining for each of at least a plurality of other commands in the queue from its respective logical block address and transfer length a starting cylinder, a starting angular position, an ending cylinder, and an ending angular position during a first execution interval of the first active command;

the embedded microprocessor controller including second processing means for determining during the first execution interval for each of at least the plurality of other commands in the queue its respective lead time latency relative to completion of the first execution interval, wherein the lead time latency is determined with respect to head switch, seek and rotational latencies;

the embedded microprocessor controller including third processing means for determining which command of the plurality of other commands has the least lead time latency during the first execution interval; and the embedded microprocessor controller including fourth processing means for reordering the queue within the cache buffer memory such that a second command having the least lead time latency becomes a second active command being executed by the microprocessor controller during a second command execution interval following completion of the first execution interval of the first active command.

7. The disk drive of claim 6, wherein the embedded microprocessor controller further comprises fifth processing means for removing the first active command from the queue after completion of the execution interval of the first active command and during the second command execution interval when the real time processing and control means is executing the second active command and the second, third and fourth processing means are processing a remaining plurality of other commands in the queue to determine a third command having least lead time latency relative to the second active command and are reordering the queue.

8. The disk drive of claim 7 wherein the third processing means determines least lead time latency in accordance with:

$$L = \begin{matrix} R+(n+1)*T \text{ if } S-n*T > R \\ R+N*T \text{ if } S-n*T <= R \end{matrix}$$

where R is disk rotation time, S is track seek time, T is the time required for a single revolution of a disk within the disk drive, and n is the integer number of complete revolutions of the disk which can occur during the seek time.

9. The disk drive of claim 8 wherein each data storage surface defines a series of evenly spaced apart embedded servo sectors including head positioning information used by the disk drive microprocessor controller for controlling repositioning of the head and wherein disk rotational time R is determined by the third processing means by solving:

$$R = \Delta sector*(T/sectors\_per\_track),$$

$$\Delta sector = (sector_{dest} - second_{src})$$

MODsectors-per-track.

* * * * *